May 8, 1962   J. B. BRAUNWARTH   3,033,904
PROCESS FOR THE PRODUCTION OF PHENOLS
Filed Dec. 8, 1958
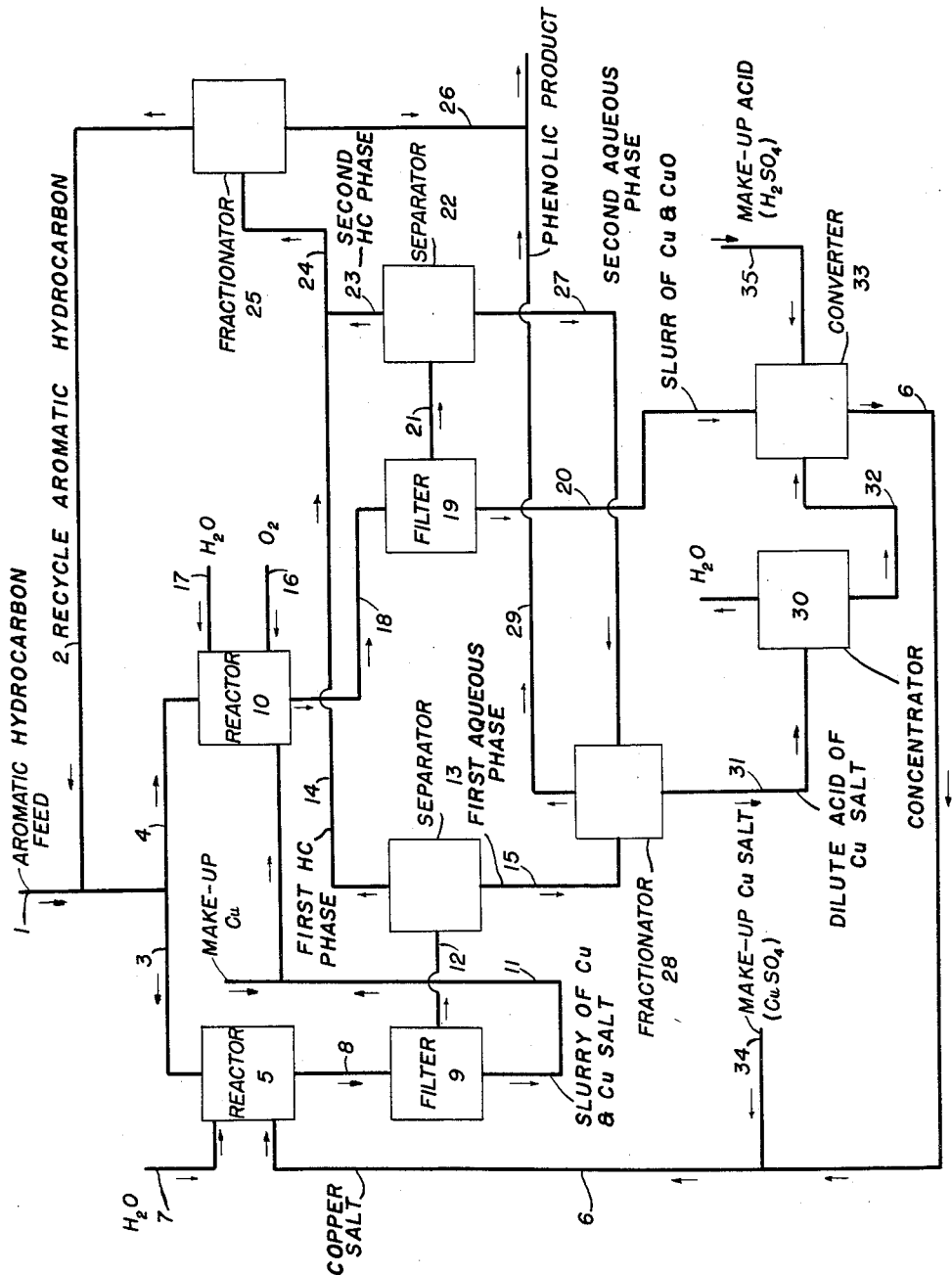
INVENTOR.
JOHN B. BRAUNWARTH
BY
ATTORNEY

United States Patent Office 3,033,904
Patented May 8, 1962

3,033,904
PROCESS FOR THE PRODUCTION OF PHENOLS
John B. Braunwarth, Crystal Lake, Ill., assignor to The Pure Oil Company, Chicago, Ill., a corporation of Ohio
Filed Dec. 8, 1958, Ser. No. 778,702
7 Claims. (Cl. 260—621)

This invention relates to a method of preparing phenols and alkyl-substituted phenols, i.e., cresols, from aromatic hydrocarbons having at least one unsubstituted nuclear hydrogen atom by direct oxidation in the presence of a copper compound, with or without added alkali metal phosphate. This invention relates particularly to a combination process wherein the catalyst is conitnuously regenerated and used in two integrated steps to produce phenols from continuously recycled aromatic hydrocarbons.

It is known in the art to prepare phenols and alkyl-substituted phenols by the reaction of aromatic hydrocarbons with copper sulfate and water at temperatures above about 350° F. This reaction proceeds as follows:

(1) $ArH + CuSO_4 + H_2O \rightarrow Cu + ArOH + H_2SO_4$

In a copending application Serial Number 764,256, filed September 30, 1958, now U.S. Patent 2,976,329, issued March 21, 1961, there is described a process for increasing the yields of phenols by conducting Reaction 1 in the presence of an alkali metal phosphate. In another copending application Serial Number 771,191, filed November 3, 1958, now Patent No. 2,994,722, there is described a process for continuing Reaction 1 by utilization of the copper formed to catalyze the reaction of more aromatic hydrocarbon with air to form additional yields of phenols. This process may be expressed as:

(2) $Cu + ArH + O_2 \rightarrow CuO + ArOH$

Reaction 2 may be conducted with the addition of small quantities of copper sulfate to increase the yield.

The present invention relates to a process for reforming the copper sulfate from the copper oxide formed in Reaction 2 by reaction with sulfuric acid from Reaction 1 for recycle to Reaction 1. The step of this invention may be exemplified by the following reaction:

(3) CuO (from Reaction 2) + $H_2SO_4$ (from Reaction 1) → $CuSO_4$ (for recycle to Reaction 1) + $H_2O$ In one embodiment of the invention it has been found that by proper manipulation and control of the separation of the products of Reaction 1, the requisite catalytic amount of copper sulfate can be retained with the metallic copper transferred to Reaction 2. In another embodiment of the invention it has been found that the phenol-rich aromatic products from Reactions 1 and 2 can be continuously fractionated to recover the produced phenol, and the aromatic hydrocarbon separated can be recycled to Reactions 1 and 2.

In the preparation of phenol by direct oxidation of benzene in the presence of copper sulfate, the best yield of phenol that is reported by this reaction is 25 mol percent. The best prior art yield of cresol, starting with toluene, is about 8.7 mol percent. The reaction takes place in the presence of water at temperatures above about 350° F.

Accordingly, it is an object of the invention to provide a three-step process for producing phenols and alkyl-substituted derivatives thereof by the (1) direct oxidation of aromatic hydrocarbons having at least one un-substituted hydrogen atom per molecule in the presence of a copper compound, and water, with or without added alkali metal phosphate, (2) the conversion of further amounts of aromatic hydrocarbon to phenols in the presence of the metallic copper formed in the first step and water, and (3) the utilization of the sulfuric acid formed in the first step and copper oxide formed in the second step to regenerate the copper sulfate.

It is another object of the invention to provide a three-step integrated process for producing phenols and alkyl-substituted derivatives thereof by direct oxidation of aromatic hydrocarbons having at least one unsubstituted hydrogen atom per molecule in the presence of a copper compound, water and less than mol-for-mol ratios of alkali metal phosphate, based on the mols of said copper compound.

A further object of the invention is to provide a process for producing phenols and alkyl-substituted derivatives thereof by direct oxidation of aromatic hydrocarbons having at least one unsubstituted hydrogen atom per molecule in the presence of a copper compound, water and added alkali metal phosphate at temperatures above about 350° F., utilizing the metallic copper formed to produce more phenols from unreacted aromatic compound by the direct oxidation of the aromatic hydrocarbons with oxygen or air, the metallic copper being simultaneously oxidized to copper oxide, and regenerating the copper sulfate by the reaction of by-products from these reactions.

Another object of the invention is to provide a process for producing phenols and alkyl-substituted derivatives thereof by direct oxidation of aromatic hydrocarbons having at least one unsubstituted hydrogen atom per molecule in the presence of a copper compound, water, and less than mol-for-mol ratios of alkali metal phosphate, based on the mols of said copper compound, at temperatures above about 350° F., and separating metallic copper and copper sulfate from the first reaction to be used for producing more phenols from the unreacted or additional aromatic hydrocarbons.

Another object of this invention is to provide a three-step process for producing phenols and alkyl-substituted derivatives thereof by direct oxidation of benzene or toluene in the presence of a coppor compound, water, and added alkali metal phosphate at temperatures above about 350° F.

And a further object of this invention is to provide an integrated process for producing phenols and cresols by direct oxidation of benzene or toluene in the presence of copper sulfate, water, and between about 0.01 to 0.10 mol of trisodium phosphate per mol of copper sulfate in one step, producing phenols and cresols from the same aromatic compound and metallic copper, and regenerating the copper sulfate.

These and further objects of the invention will be described or become apparent as the specification proceeds.

The drawing is a simplified flow diagram illustrating one embodiment of the invention.

The process of this invention will be illustrated also by a number of examples, showing the prior art processes, the effect of added alkali metal phosphates, and how the regeneration steps are tied to the hydrocarbon oxidation steps.

The following examples illustrate the first step in the process.

EXAMPLE 1

Benzene, copper sulfate pentahydrate and water are mixed in accordance with the prior art in a stainless steel autoclave which is sealed and heated to about 625° F., and maintained at this temperature, with constant shaking, for a period of about 2 hours. This reaction proceeds with the production of about 25 mol percent of phenol. The metallic copper formed in the reaction is isolated by filtration and is then ready for the second step of the process.

EXAMPLE 2

The reaction in Example 1 is repeated using toluene instead of benzene. The best yield obtainable is about 8.7 mol percent.

EXAMPLE 3

Into a 155 cc. stainless steel autoclave were placed 23.5 cc. of distilled water, 12.75 gm. of copper sulfate pentahydrate (0.051 mol), 23.5 gm. of benzene and 1 gm. of trisodium phosphate dodecahydrate. The system was sealed, heated to 580° F. and maintained at this temperature for two hours. The system was then allowed to cool to room temperature and the reaction mixture collected. The pricipitate of copper was removed by filtration and the benzene phase was separated and collected. The aqueous phase and filter cake were washed five times with 30 cc. portions of toluene, and the combined benzene and toluene phases were analyzed for phenol by titration with aqueous iodine solution. The yield of phenol was 0.0189 mol.

The aqueous phase was distilled and the overhead aqueous distillate was analyzed for steam-volatilized phenol. The yield of phenol was 0.0023 mol, making the total phenol formed in the reaction of 0.0212 mol, or a yield of 41 mol percent in comparison to the yield of about 25 mol percent in Example 1.

EXAMPLE 4

Again using a 115 cc. stainless steel autoclave, 23.5 cc. of distilled water, 12.8 gm. of copper sulfate pentahydrate, 23.5 gm. of toluene and 1 gm. of Kelite (a trisodium phosphate compound) were charged. The system was sealed and heated at 560° F. for two hours. Once the system was opened, the reaction mixture was worked up in a manner similar to Example 3. The total amount of cresol collected was 0.00481 mol, or a yield of 9.4 mol percent.

The metallic copper which is isolated from these copper sulfate oxidations can then be used for the second step of the process. In order to demonstrate the second step, three experiments were conducted with results as outlined in the following table. These experiments were conducted as follows:

A 115 cc. autoclave was charged with toluene, water and the other materials listed for each run. Then the autoclave was sealed, flushed thoroughly, and pressurized to about 75 p.s.i.g. with oxygen gas. Thereafter, the autoclave was heated to about 615° F., at which temperature it was maintained for two hours while the reaction mixture was agitated by rocking. Operating pressures reached 1000 to 1500 p.s.i.g. during the heating.

At the end of the two-hour reaction period, the reaction mixture was cooled to room temperature and the final pressure was recorded. Then the reaction mixture was removed from the autoclave, insoluble material was removed by filtration, and the aqueous and hydrocarbon phases were separated by decantation. Both phases were analyzed for phenols. From the initial and final pressures, the amount of oxygen (limiting reactant) consumed was calculated, and from this value and the determined amount of phenol in the product, the yield of phenol (based on oxygen consumption) was calculated. The data for these three experiments are recorded in the following Table I as Examples 5, 6, and 7.

Example 5 shows that the oxidation of toluene conducted in the absence of metallic copper produced no cresol. Example 7 shows that in the presence of catalytic amounts of copper sulfate, yields of 7.6 mol percent are obtained.

Table I

| Example | 5 | 6 | 7 |
|---|---|---|---|
| Charge: | | | |
| Toluene, cc | 27.0 | 27.0 | 27.0 |
| Water, cc | 23.5 | 23.5 | 23.5 |
| Copper, g | | 3.2 | 3.2 |
| $CuSO_4$(g.) | | | 0.1 |
| Initial $O_2$ press., p.s.i.g | 74 | 74 | 75 |
| Final $O_2$ press., p.s.i.g | | 47 | 42 |
| Mol $O_2$ pressure drop | | 0.0048 | 0.0058 |
| Product: | | | |
| Moles of cresol | 0 | 0.00014 | 0.00044 |
| Cresol Selectivity (Mole percent)[1] | 0 | 2.9 | 7.6 |

[1] Based on oxygen, the limiting reactant.

The relationship of the various steps of the invention is best explained by reference to the flow diagram. Fresh feed (aromatic hydrocarbon) enters the process through line 1, combines with recycle feed from line 2, and divides into branch-lines 3 and 4. Through line 3, the feed flows to reactor 5, wherein it is contacted with copper sulfate entering at line 6 and water entering at line 7, under conditions just described. Reaction effluent, consisting of phenol, unreacted hydrocarbon, copper, unreacted copper sulfate, sulfuric acid, and water, is withdrawn through line 8 to filter 9. Recovered copper and copper sulfate, in the form of an aqueous slurry, is transferred through line 11 from filter 9 to reactor 10. Liquid from filter 9 flows through line 12 to separator 13, from which a hydrocarbon phase is withdrawn through line 14, and an aqueous phase through line 15.

Feed flowing through line 4 passes to reactor 10, wherein it is reacted with oxygen entering through line 16, and water entering at line 17, in the presence of copper and copper sulfate entering through line 11, under the conditions taught in application Serial Number 771,191, i.e., the mixture is held at a pressure of about 75 p.s.i.g., a temperature of about 615° F. for about 2 hours during which time the pressure rises to about 1000–1500 p.s.i.g. Effluent from reactor 10, consisting of phenol, unreacted hydrocarbon, copper oxide, unreacted copper, and water, is withdrawn through line 18 to filter 19. Copper oxide and copper are withdrawn as slurry from filter 19 through line 20. Liquid from filter 19 flows through line 21 to separator 22.

Hydrocarbon phases from separator 13 (flowing through line 14) and from separator 22 (flowing through line 23) join to form stream 24, which flows to fractionator 25. In fractionator 25, unreacted hydrocarbon is separated from phenol and recycled through line 2 and branch-lines 3 and 4 to reactors 5 and 10. Phenol is withdrawn from fractionator 25 through line 26.

Aqueous phases from separators 13 and 22 flow through lines 15 and 27, respectively, to fractionator 28, wherein phenol is distilled from water and sulfuric acid and withdrawn through line 29 to join phenol product in line 26. Dilute sulfuric acid is withdrawn from fractionator 28 and transferred to concentrator 30 through line 31. In concentrator 30, water is removed, and the more concentrated sulfuric acid is transferred via line 32 to converter 33. In converter 33, the acid reacts with copper oxide entering through line 20 to form copper sulfate, which is recycled to reactor 5 through line 6. Make-up copper salt, e.g., copper sulfate is added at line 34 and make-up acid, e.g., sulfuric acid is added at line 35, as required.

The invention is applicable to the use of alkali metal phosphates which group includes trisodium phosphate, tripotassium phosphate, trilithium phosphate, disodium phosphate, dipotassium phosphate, dilithium phosphate, sodium phosphate, potassium phosphate, and lithium phosphate. Of these salts of orthophosphoric acid, the tri-alkali metal, or normal, salts are preferred.

The copper compounds used may be of the cuprous or cupric variety, although the latter are preferred. In general, the reaction may be carried out using inorganic water-soluble copper salts which function in the manner of copper sulfate. The copper compounds may be illustrated by copper sulfate (anhydrous), copper sulfate pentahydrate, copper phosphate, copper chloride, and the like.

The amounts of aromatic hydrocarbon used may vary from about 1 to 10 mols per mole of copper compound to be reacted. Preferably, an excess of aromatic hydrocarbon is used. Since it requires one molecule of water to react with one molecule of copper compound to form one molecule of phenol, there should be sufficient water present to react with all of the copper compound. Preferably, a relatively large amount of water is used in the reaction. In general, it is preferred to use at least about 10 mols of water per mol of aromatic hydrocarbon feed to the reaction zone. However, higher mol ratios of water-to-hydrocarbon are preferred, as for example mol ratios of about 20:1 to as high as 100:1. Excessive amounts of water do not interfere with the reaction. For best results at least about 10 mols to 75 mols of water per mol of hydrocarbon should be used.

The amounts of copper salt should be at least greater than the amount of phosphate salt present. If mol-for-mol amounts of alkali metal phosphate and copper salt, or greater than mol-for-mol amounts are used, the yield of phenol, for example, will be reduced to almost less than that obtained if no alkali metal phosphate is present. Accordingly, the amount of alkali metal phosphate should not be equivalent to the amount of copper compound, and preferably should be regulated so that less alkali metal phosphate is present than copper compound. In general, between about 0.01 to 0.2 mol of alkali metal phosphate is used per mol of copper compound for best results. The preferred ratio of alkali metal phosphate to copper compound is about 0.03 to 0.1.

The reaction is carried out either batchwise or continuously. In batchwise operation the oxidation is maintained under conditions of pressure and temperature such that the water and benzene are maintained in a liquid phase, although the phase relationship of the reactants does not appear to influence the reaction. For the second step of the process, the amounts of metallic copper used may vary from about 0.05 to 10 mols per mole of aromatic compound to be reacted. In continuous operation, the aromatic hydrocarbon oxygen (or air), and water are passed in vapor phase through a fixed bed of the metallic copper. The copper compound can be charged with the water. Fluidized-solids operation may also be applied.

The temperature for the first and second steps must be maintained above about 350° F. for the reaction. A preferred reaction temperature is between about 350 and 710° F., and 500 to 675° F. gives the best results. Side reactions are promoted by the use of temperatures higher than 710° F. Although prior art processes operate at a low conversion per pass and depend on recycling of the aromatic hydrocarbon to increase the yields, such a procedure is not mandatory in the instant process because the yields are substantial on a single-pass basis. However, recycling will also increase the yields in the instant process.

The aromatic hydrocarbons used as feed to the process include benzene, naphthalene and alkyl-substituted derivatives thereof having at least one unsubstituted nuclear hydrogen atom. The alkyl group attached to the aromatic nucleus may contain from 1 to 18 carbon atoms and the alkyl groups may be straight-chain, branched-chain, or alicyclic. Examples of feed hydrocarbons include benzene, toluene, ortho-xylene, meta-xylene, para-xylene, ethylbenzene, the trimethylbenzenes, propylbenzene, cymene, durene, isodurene, and prehnitene, phenylbenzene, diphenylene, p-diphenylbenzene, diphenylmethane, 1,1-diphenylmethane, dibenzyl, triphenylmethane, indene, naphthalene, 1,2,5-trimethylnaphthalene, enthracene, and phenanthrene.

As one feature of the invention, the reaction mixture in line 8 comprising unreacted aromatic hydrocarbon, phenol, copper sulfate, water, copper and sulfuric acid is treated in filter 9 so that a small amount, or requisite catalytic amount, of copper sulfate is retained in the aqueous phase along with the metallic copper to act as a catalyst in reactor 10. This is accomplished by filtering the effluent from reactor 5 through a filter aid or filter material selected from the group of Filtrol, clay, diatomaceous earth, fuller's earth, etc., in rather coarse form, at temperatures of about 150° to 250° F. In this way, a small amount of copper sulfate, that is, about 0.001 to 1.0 wt. percent based on the total weight of filtrate, is retained in the aqueous phase in line 11. This increases the yield of phenols obtained in reactor 10 in the presence of metallic copper.

It is to be observed that by operating in this manner the hydrocarbon phases can be combined and fractionated in a single tower and the aqueous phases are similarly combined and fractionated. This reduces the number of steps in the product recovery operations and also in the catalyst recovery. It has also been found that only a small amount of alkali metal phosphate is required to initiate a more efficient catalytic reaction, and often the system is on stream, none or very little alkali metal phosphate need be added. The phosphates recirculate with the aqueous phase.

What is claimed is:

1. The process of producing phenols from aromatic hydrocarbons having at least one unsubstituted nuclear hydrogen atom which comprises reacting said aromatic hydrocarbon in a first reaction zone with water and a copper salt of the group consisting of copper sulfate, copper sulfate pentahydrate, copper phosphate and copper chloride at a temperature of about 350° to 710° F. under superatmospheric pressures, separately recovering the phenol product and by-products comprising metallic copper and an acid corresponding to said copper salt from said reaction, reacting additional aromatic hydrocarbon in a second reaction zone with an oxygen-containing gas, water and said metallic copper at a temperature of about 350° F. to 710° F. under superatmospheric pressures, separately recovering phenols and cupric oxide from the products of said second reaction and reacting said recovered by-product acid corresponding to said copper salt with said cupric oxide to reform said copper salt for recycle to said first reaction zone.

2. The process in accordance with claim 1 in which the reaction products from said first reaction zone are subjected to filtration in the presence of a filter aid in the temperature range of about 150 to 250° F. to recover an aqueous slurry of metallic copper and a catalytic amount of said copper salt and said slurry is recycled to said second reaction zone.

3. The process in accordance with claim 1 in which said aromatic hydrocarbon is benzene and said product is phenol.

4. The process in accordance with claim 1 in which said aromatic hydrocarbon is toluene and said product is cresol.

5. The process of producing phenols comprising reacting an aromatic hydrocarbon having at least one unsubstituted nuclear hydrogen atom with water and a copper salt of the group consisting of copper sulfate, copper sulfate pentahydrate, copper phosphate and copper chloride in a first reaction zone at a temperature of about 350° to 710° F. under superatmospheric pressures to form a first reaction mixture comprising phenols, unreacted aromatic hydrocarbon, unreacted copper salt, copper, the free acid of said copper salt, and water, filtering said first reaction mixture in the presence of a filter aid at a temperature of about 150° to 250° F. to recover an aqueous slurry containing said copper and copper salt and a first mixed-phase filtrate, separating said filtrate into a first aqueous phase and a first hydrocarbon phase, passing said aqueous slurry into contact with additional aromatic hydrocarbon in the presence of an oxygen-containing gas in a second reaction zone at a temperature of about 350°

F. to 710° F. under superatmospheric pressures to form a second reaction mixture comprising phenols, unreacted aromatic hydrocarbon, copper oxide, unreacted copper and water, filtering said second reaction mixture to form an aqueous slurry of said copper and copper oxide and a second mixed-phase filtrate, separating said second filtrate into a second aqueous phase and a second hydrocarbon phase, fractionating said first and second hydrocarbon phases to separate phenols therefrom, fractionating said first and second aqueous phases to recover additional phenols and a bottoms comprising diluted free acid corresponding to said copper salt, concentrating said free acid, reacting said concentrated free acid with said aqueous slurry of copper and copper oxide to reform said copper salt and recycling said copper salt to said first reaction zone.

6. The process for producing phenol comprising contacting benzene with water and copper sulfate in a first reaction zone at a temperature of about 350 to 710° F. under superatmospheric pressures to form a reaction mixture comprising phenol, unreacted benzene, copper, unreacted copper sulfate, sulfuric acid and water, filtering said reaction mixture in the presence of a filter aid at a temperature of about 150° to 250° F. to recover an aqueous slurry containing said copper and copper sulfate and a first mixed-phase filtrate, separating said filtrate into a first aqueous phase and a first hydrocarbon phase, passing said aqueous slurry into contact with additional benzene in the presence of oxygen in a second reaction zone at a temperature of about 350° F. to 710° F. under superatmospheric pressures to form a second reaction mixture comprising phenol, unreacted benzene, copper oxide, unreacted copper and water, filtering said second reaction mixture to form an aqueous slurry of copper and copper oxide and a second mixed-phase filtrate, separating said second filtrate into a second aqueous phase and a second hydrocarbon phase, combining said first and second hydrocarbon phases, fractionating said combined phases to separate phenol therefrom, combining said first and second aqueous phases, subjecting the combined aqueous phases to fractionation to form additional phenol as overhead and a bottoms comprising dilute sulfuric acid, concentrating said sulfuric acid, reacting said concentrated sulfuric acid and aqueous slurry of copper and copper oxide to form copper sulfate and recycling said copper sulfate to said first reaction zone.

7. The process for producing cresols comprising contacting toluene with water and copper sulfate in a first reaction zone at a temperature of about 350 to 710° F. under superatmospheric pressures to form a reaction mixture comprising cresols, unreacted toluene, copper, unreacted copper sulfate, sulfuric acid and water, filtering said reaction mixture in the presence of a filter aid at a temperature of about 150° to 250° F. to recover an aqueous slurry containing said copper and copper sulfate and a first mixed-phase filtrate, separating said filtrate into a first aqueous phase and a first hydrocarbon phase, passing said aqueous slurry into contact with additional toluene in the presence of oxygen in a second reaction zone at a temperature of about 350° F. to 710° F. under superatmospheric pressures to form a second reaction mixture comprising cresols, unreacted toluene, copper oxide, unreacted copper and water, filtering said second reaction mixture to form an aqueous slurry of copper and copper oxide and a second mixed-phase filtrate, separating said second filtrate into a second aqueous phase and a second hydrocarbon phase, combining said first and second hydrocarbon phases, fractionating said combined phases to separate cresols therefrom, combining said first and second aqueous phases, subjecting the combined aqueous phases to fractionation to recover additional cresols as overhead and a bottoms comprising dilute sulfuric acid, concentrating said sulfuric acid, reacting said concentrated sulfuric acid and aqueous slurry of copper and copper oxide to form copper sulfate and recycling said copper sulfate to said first reaction zone.

References Cited in the file of this patent

UNITED STATES PATENTS

| | | |
|---|---|---|
| 2,199,585 | Bone et al. | May 7, 1940 |
| 2,749,368 | Fortuin et al. | June 5, 1956 |
| 2,760,991 | Toland | Aug. 28, 1956 |
| 2,852,567 | Barnard | Sept. 16, 1958 |